(12) United States Patent
Pertsel et al.

(10) Patent No.: US 7,714,903 B2
(45) Date of Patent: May 11, 2010

(54) WIDE DYNAMIC RANGE IMAGE CAPTURING SYSTEM METHOD AND APPARATUS

(75) Inventors: Shimon Pertsel, Sunnyvale, CA (US); Ohad Meitav, Cupertino, CA (US)

(73) Assignee: Zoran Corporation, Sunnyvale, CA (US)

( * ) Notice: Subject to any disclaimer, the term of this patent is extended or adjusted under 35 U.S.C. 154(b) by 775 days.

(21) Appl. No.: 11/467,993

(22) Filed: Aug. 29, 2006

(65) Prior Publication Data
US 2008/0055440 A1    Mar. 6, 2008

(51) Int. Cl.
H04N 5/235 (2006.01)
(52) U.S. Cl. .................................. 348/229.1
(58) Field of Classification Search .............. 348/229.1
See application file for complete search history.

(56) References Cited

U.S. PATENT DOCUMENTS

| | | | |
|---|---|---|---|
| 4,779,137 A | 10/1988 | Tojo et al. | |
| 5,335,075 A | 8/1994 | Komiya et al. | |
| 5,872,596 A | 2/1999 | Yanai et al. | |
| 5,892,541 A | 4/1999 | Merrill | |
| 6,011,251 A | 1/2000 | Dierickx et al. | |
| 6,018,365 A | 1/2000 | Merrill | |
| 6,115,065 A * | 9/2000 | Yadid-Pecht et al. | 348/308 |
| 6,278,490 B1 | 8/2001 | Fukuda et al. | |
| 6,441,848 B1 | 8/2002 | Tull | |
| 6,642,503 B2 | 11/2003 | Kummaraguntla et al. | |
| 6,771,312 B2 * | 8/2004 | Kamishima et al. | 348/229.1 |
| 6,906,751 B1 | 6/2005 | Norita et al. | |
| 6,919,549 B2 | 7/2005 | Bamji et al. | |
| 6,946,635 B1 * | 9/2005 | Pine | 250/208.1 |
| 6,977,685 B1 | 12/2005 | Acosta-Serafini et al. | |
| 7,050,091 B2 | 5/2006 | Tull | |
| 7,221,396 B2 * | 5/2007 | Lenz | 348/297 |
| 7,605,852 B2 * | 10/2009 | Olsen et al. | 348/297 |
| 2002/0067415 A1 | 6/2002 | Denyer et al. | |
| 2002/0122126 A1 | 9/2002 | Lenz | |

(Continued)

FOREIGN PATENT DOCUMENTS

WO    WO 97/17800    5/1997

OTHER PUBLICATIONS

Notification of Transmittal of the International Search Report and Written Opinion of the International Searching Authority, or the Declaration for International Application No. PCT/US2007/076902, mailed Jun. 26, 2008, 11 pages.

*Primary Examiner*—James M Hannett
(74) *Attorney, Agent, or Firm*—Dickenstein Shapiro LLP

(57) ABSTRACT

An image capture system is presented where the dynamic range of photo imaging devices, such as a still or video camera, is increased by varying sensor exposure time on a pixel-by-pixel basis under digital camera processor control. The systems photo sensors are continuously illuminated without reset over the exposure interval. In addition to being interrogated at the end of the exposure interval, the pixels are also non-destructively interrogated at one or more intermediate times during the interval. At each interrogation, the image capture system determines individually whether the pixels have saturated and if not, the parameter value is recorded; if the pixel has saturated, the previously stored value from the preceding interval is maintained. To produce the final sensor value for the whole exposure interval, the data for pixels that reached the saturation level are adjusted to compensate for their shortened exposure.

32 Claims, 4 Drawing Sheets

U.S. PATENT DOCUMENTS

| | | |
|---|---|---|
| 2002/0154232 A1 | 10/2002 | Tull |
| 2003/0076432 A1 | 4/2003 | Luo et al. |
| 2005/0057670 A1 | 3/2005 | Tull et al. |
| 2005/0078205 A1 | 4/2005 | Hynecek |
| 2005/0253937 A1* | 11/2005 | Moholt et al. ............ 348/229.1 |
| 2005/0259167 A1 | 11/2005 | Inoue et al. |

* cited by examiner

US 7,714,903 B2

WIDE DYNAMIC RANGE IMAGE CAPTURING SYSTEM METHOD AND APPARATUS

BACKGROUND OF THE INVENTION

The present invention relates generally to image capturing systems, and, more particularly, to increasing the dynamic range of image sensing devices, such a CMOS pixel circuits, having limited dynamic range.

Digital cameras and other electronic image capturing systems have become increasingly common. In such systems, photographic film is replaced by an array of photo sensors. Although such systems have a number of advantages with respect to film based system, they typically lack the dynamic range of photographic film.

A common type of image sensing element uses CMOS active picture elements. Such image sensor devices of the CMOS active picture element variety rely on having an image sensing area divided into a large number of photosensitive areas, or pixels. These areas produce an output signal determined by the light incident on the physical location of the pixel, with the pixel information being read out to a set of external electronics following a predetermined scanning sequence. Random addressing, sequential addressing, or some combination of the two may be used. A typical pixel circuit using three transistors is shown in FIG. 1.

In FIG. 1, the diode D1 is normally biased in its reverse direction, so that if it is previously charged to a voltage, photons impinging on the diode will produce carriers which discharge its terminal voltage as seen at wire 3. Transistor M1 serves as a reset transistor for recharging the diode voltage. When the row voltage VRES on wire 1 is taken in a sufficiently positive direction, it causes conduction in transistor M1 and charges the diode voltage towards the voltage VDD on wire 4. This reset action is normally initiated at the start of a time when the diode will be used to accumulate photon information about the impinging light's intensity.

After a predetermined exposure time, the light intensity information for this pixel is read out by using the transistors M2 and M3. Transistor M2 serves as a source follower, with the voltage on its source at 5 being a function of the diode voltage at 3. The voltage source VDD on wire 4 provides a current to operate the source follower. When the particular row of pixels containing this pixel is selected for readout, the row voltage VSEL on wire 2 is taken in a positive direction, turning on transistor M3. Transistor M3 is usually operated as a switch, to connect the source terminal of M2 to the readout column line 6. A current sink I at the end of the column line provides operating current for the source follower M2, so that the output voltage on the column line VOUT will be proportional to the voltage on the diode at 3.

After the intensity information is read out and is no longer needed, the row reset input VRES may be activated to cause the pixel voltages to be restored to the value representing zero light intensity. In addition to functioning as a reset transistor, M1 may also be used to limit the lower voltage to which wire 3 may descend. This prevents diode D1 from becoming zero or forward biased, and therefore prevents the injection of minority charges into the substrate. Charges injected into the substrate may diffuse to adjacent pixels, causing spreading or blooming in the image of bright image spots. In many systems, this anti-blooming feature is used to hold the pixel voltages at their lower level until the reset action is initiated to prepare for a new image exposure.

For simple image sensor usage, the pixel in FIG. 1 may be formed into an array of cells with control and readout circuitry surrounding it on a single silicon integrated circuit. FIG. 2 shows an exemplary two-dimensional image sensor conceptual diagram.

In the two-dimensional imager of FIG. 2, a rectangular area 10 is populated with an array of pixels such as those shown in FIG. 1, with some of the row and column wires shown for clarity. Control logic 11, primarily located at an edge of the pixel array, operates the VSEL and VRES wires for each row of the pixel array. Counters, gates, and/or shift registers in this logic generate the control signals needed to follow the desired pixel readout sequence. When a pixel row is selected, the information from it goes to the readout circuitry 12, as signals on the columns wires 13. The resulting pixel information is output on 14 as either analog or digital signals as needed.

For normal sequential scanning, the control logic 11 activates one row reset signal VRES at a time, following a linear scan pattern descending from the top of the pixel array 10 to the bottom. Consider for this example that at the time of interest, the VRES signal is being applied to row A. At the same time, the control logic also sends the select signal VSEL to a different row, which we may choose to be row B in this example. The pixel information from row B will then be sent to the readout circuitry 12 on the entire set of column wires, of which 13 is an example, and the readout circuitry will choose which column information to send out on the connection 14.

The total pixel exposure interval for a row of image sensor pixels is determined by the delay time between the application of a first VRES and a second VRES to a particular pixel row. During this time period the light illuminating the image sensor is not interrupted. The amount of sensor pixel row exposure per interrogation cycle interval is determined by the delay time between the application of the VRES and the VSEL to a particular sensor pixel row. If rows are being scanned in a regular periodic manner, this time interval will be determined in turn by the row number spacing between row A and row B. Thus the amount of time the image sensor is exposed to light will be a function of the row timing delay between the row reset action and the row readout action as determined by the control logic. Image readout from a different row, such as row C with a different relative location, will give different effective image exposure time.

Although this discussion is based on one of the simpler three transistor cells in use, this configuration exhibits the sort of limited dynamic range due to saturation that is also found in the various other image sensing element designs known in the art. Compared to the dynamic range available from film, such elements will consequently exhibit saturation when exposed to a bright image while still being under exposed for a dark image.

There are numerous methods and apparatus that have been proposed to increase the dynamic range of photo sensors in general, and CMOS sensors in particular. Perhaps the most straightforward is just to increase amount of charge that is stored by the diode D1 of FIG. 1; however, this results in a larger pixel circuit, when the trend is to reduce pixel size in order to increase resolution.

The prior art present a number of alternate techniques for dealing with these problems; however, these suffer from one or more serious practical problems, such as requiring non-standard sensors, increased memory requirements, or multiple sensor resets. For example, U.S. Pat. No. 6,977,685 is illustrative of the class of CMOS sensor dynamic range enhancement technologies that rely upon resetting individual pixels during the course of photo sensor exposure to light as the primary means of effecting dynamic range extension. In U.S. Pat. No. 6,946,635 the sensor pixels are read out two or more times without resetting the image sensor, but require that these readings are separated by a shutter opening and closing cycle at the point of sensor (photo detector) re-exposure, so that the exposure of the array is not continuous for a single image. U.S. Pat. No. 6,115,065 employs a specific, specialized image sensor that incorporates a memory cell with each image sensor pixel and calls for resetting and reading each sensor pixel site twice, one over a short exposure interval and one over a long exposure interval, and clocking out both of these values from the photo sensor. According to the teachings of U.S. Pat. No. 6,018,365, the dynamic range of an imaging system that utilizes an array of active pixel sensor cells is increased by reading each cell in the array multiple times during each integration period, saving the number of photons collected by the cell, resetting the cell if it would normally saturate by the end of the integration period, and summing of the values collected during the integration period, an approach requiring both the resetting of cells and additional memory. United States Patent Application 20020067415 offers a method of operating a solid state image sensor having an image sensing array that includes a plurality of active pixels, the resetting of each pixel, and after successive time periods, reading outputs from each pixel, to obtain multiple sets of image data having different dynamic ranges that are then combined, an approach again requiring both the resetting of cells and additional memory.

All these various approaches suffer from the need to either use non-standard CMOS sensors that are significantly more costly to manufacture and control than the CMOS sensors commonly in use, or require significantly more image buffer memory to properly operate. One proposed approach for increasing CMOS sensor dynamic range, while using standard CMOS sensors, is to capture two to more images, taken very close together in time, at different exposures, at least one which displays the shadow detail of the image (taken at a high exposure) and at least one which displays the highlight detail (taken at a low exposure). These multiple images, which need to be corrected for any motion present in the images occurring between individual image capture, are combined into a single image that displays both shadow and highlight detail. This approach does result in an increase of dynamic range; however, the processing complexity to motion compensate and appropriately combine the two or more captured images, and the additional buffer memory required, is excessive by current standards, and therefore this solution, to date, has not been shown as a practical answer to the problem. The need to use specialized, non-standard sensors, add memory, or reset pixels during the expose interval all have serious drawbacks. Consequently, there is a need for improved techniques to increase the dynamic range of photo sensors.

SUMMARY OF THE INVENTION

The present invention relates to extending the dynamic range of photo imaging devices, such as a still or video camera, by varying sensor exposure time on a pixel-by-pixel basis under digital camera processor control. This can be achieved using a largely standard CMOS sensor that is continuously illuminated, and sensitive to illumination, during the entire exposure interval. Thus, present invention represents a practical, cost effective approach acceptable to CMOS sensor manufacturers to significantly expand the dynamic range of imaging systems, such as digital cameras, that use CMOS sensors.

The present invention illuminates the photo sensors continuously without reset over the exposure interval. Once a pixel is reset, in addition to being interrogated at the end of the exposure interval, it is also non-destructively interrogated at one or more intermediate times during the interval. For instance, in one exemplary embodiment, the interval is divided into ten equal subintervals. Other embodiments may use a different number of subintervals, unequal intervals, or both. At each interrogation, the device determines individually whether the pixels have saturated and if not, the parameter indicative of the cumulative exposure level (such as the voltage in a CMOS sensor) is checked to see if has reached a limit value (such as the saturation level): if the pixel has not saturated, the parameter value is recorded; if the pixel has saturated, the previously stored value from the preceding interval is maintained. To produce the final sensor value for the whole exposure interval, the data for pixels that reached the saturation level are adjusted to compensate for their shortened exposure. This adjustment can be effected by keeping track of which exposure sub-interval the recorded pixel data corresponds to, and scaling the recorded pixel accordingly, based on the relative duration of the subinterval to the full interval. Such adjustment can be performed (a) after the full exposure interval is over and all the pixel data collected or (b) "on the fly". If performed "on the fly" those pixels that have not reached the limit value can be adjusted immediately following the last interrogation cycle. For those that reach the limit value, the adjustment is performed immediately following the reaching of such limit. In either case, only one data value for each pixel is needed.

The individual photosensitive pixel elements can be formed into an array to produce an imaging system. As the rows of the array are reset, from top to bottom for example, the exposure interval begins for each row of pixels. Once the last row is reached, the first row is returned to and the rows of the array are non-destructively interrogated at an intermediate time prior to the end of the exposure interval. This nondestructive read during the exposure interval can be performed at multiple intermediate times until, at the end of the exposure interval, the integration of pixel data, corresponding to the full exposure interval, is made. At the conclusion of each of the interrogation cycles, a processor makes computations on the received pixel data, where these computations are responsive to image pixel data acquired from previous interrogations, in order to provide image pixel data with improved dynamic range. In a variation of this approach, the rows of the array are split into subgroups that are scanned separately, allowing more time for the individual scans.

As the present invention can introduce multiple effective exposure times within a single image, in addition to expanding the usable dynamic range of an imaging system, it can be used to provide a sharper image to portions of the frame. As brighter areas of the image will use pixel data for only a portion of the full interval, they will correspondingly display less motion artifacts. In alternate embodiments, the use of variable exposure times within the single image can be user selected.

BRIEF DESCRIPTION OF THE DRAWINGS

The invention may best be understood by reference to the following description taken in conjunction with the accompanying drawings in which.

DETAILED DESCRIPTION OF EXEMPLARY EMBODIMENTS

As described in the Background section, for CMOS and other sensors commonly used in today's commercially available digital cameras, the exposure time per pixel is the same for each pixel in the array. This predefines the dynamic range of the CMOS sensor for a given picture. In high contrast scenes, there are always conflicts between providing sufficient exposure time to capture details in the dark, shadow regions of an image, while simultaneously preventing saturation of bright, highlight regions of the image. The present invention discloses the means to vary sensor exposure time, on a pixel-by-pixel basis, under digital camera processor control, while using an almost standard CMOS sensor that is continuously illuminated, and sensitive to illumination, during the entire exposure interval. Thus, the present invention represents a practical, cost effective, approach, acceptable to CMOS sensor manufacturers, to significantly expand the dynamic range of imaging systems, such as digital cameras, that use CMOS sensors. In addition to CMOS sensors, other types of image sensors can be used with the present invention. The characteristics these sensors should possess are that (1) they can be non-destructively interrogated, multiple times, during a single, continuous exposure interval and (2) they built-up, or deplete, a signal level that is responsive to the cumulative amount of light falling on a photosensitive element of the sensor during the interval, such as the-charge on a storage element (the photo diode in the case of CMOS sensors) during the exposure interval.

According to its various aspects, the present invention improves image quality of an electronically captured image, by preserving image details in the highlights and shadows of the captured image. Therefore, captured images will look more like they were captured on photographic film. Further, unlike many prior art image dynamic range extension schemes, such as described above in the Background, the approach of the present invention is scalable with image sensor size, without the need to add costly additional image buffer memory. Consequently, the present invention can be implemented with little increase in cost, both initially and in the future, as photo sensor pixel densities increase.

Figure 3:
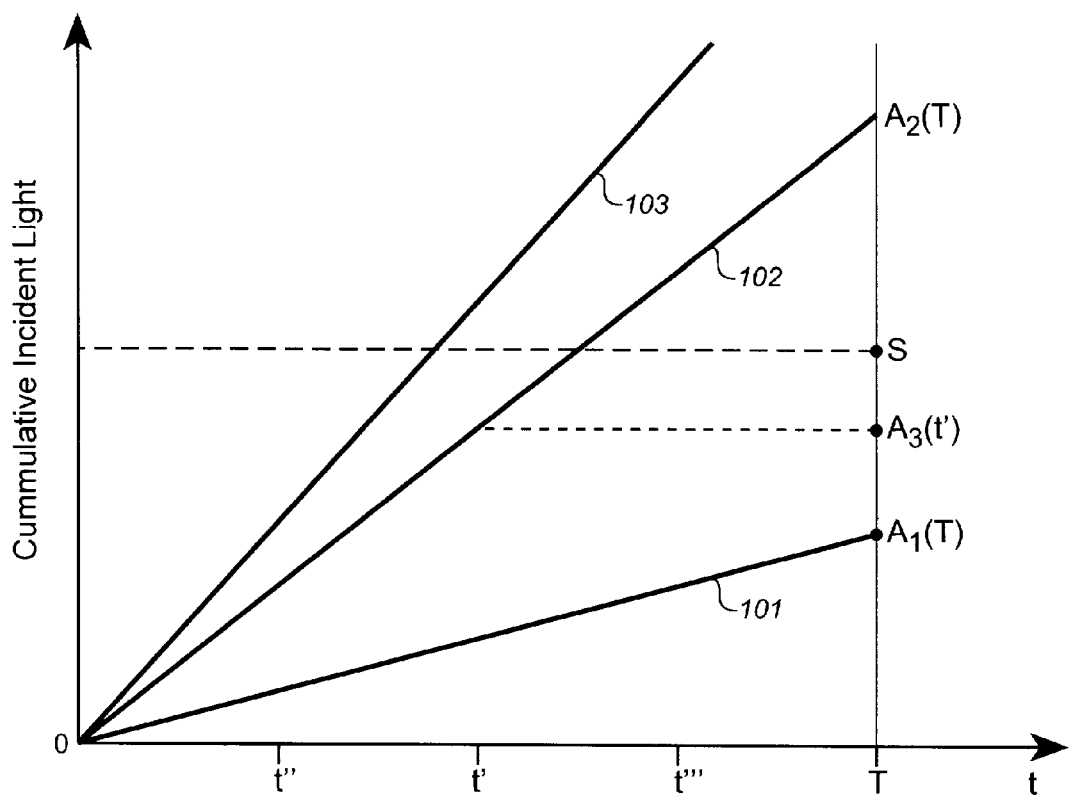
FIG. 3 shows the cumulative light incident on a pixel over an exposure period for several intensities.

The situation can be illustrated with respect to FIG. 3. FIG. 3 shows the cumulative amount of light falling on a sensor pixel versus time over an exposure time T. Time t runs along the horizontal axis beginning at the start of an exposure interval and with the end of the exposure interval at a time T. The vertical axis is the cumulative incident light. This is shown for three different light intensities, 101, 102, and 103, which can either be taken to correspond to three different pixels during the same exposure or be taken to correspond to the same pixel for different exposures. For each of these lines, the light intensity is taken to be constant over the interval, resulting in the shown straight lines, although the discussion of a more general situation readily follows.

The lowest light intensity 101 results in the amplitude $A_1(T)$ at the end of the exposure period, while the higher light intensity level 102 gives, or at least should give, the amplitude $A_2(T)$. However, if the sensor measuring this has a saturation level, S, and the accumulated number of photons exceeds this level, any pixel whose incident light exceeds this level will instead return the value S instead of the actual value. For example, rather than return the correct amplitude $A_2(T)$ for level 102, the saturation level S is returned instead. To overcome this limitation, according to a principle aspect of the present invention, the amplitude is measured at one or more intermediate times. When the amplitude is measured at the next intermediate time, or final time, this previous amplitude is replaced by the new amplitude only if the is below the saturation level. If the amplitude obtained at one of the intermediate times is used, it needs to be compensated, for it only corresponding to a portion of the entire exposure time.

For example, in FIG. 3 an intermediate time t' is introduced. For the exposure level of line 101, the amplitude can be measured at time t'. The sensor continues to be exposed and when measured again at the end of the interval, as $A_1(T) < S$, the value $A_1(T)$ replaces the value recorded at t' and is used.

For the exposure level of line 102, the amplitude measured at time t' is $A_2(t')$. The sensor again continues to be exposed, but reaches the saturation level S before T, which result in the saturation value S, rather than $A_2(T)$, being recorded for the pixel, if the value $A_2(t')$ is overwritten. Since $A_2(t')$ is the amount of signal accumulated in response to the light falling on the sensor pixel, up to exposure time t' and the exposure time t' is less than the entire exposure interval, $A_2(t')$ needs to be compensated as follows:

$$A_2(T) = (T/t')*A_2(t').$$

For example, if t'=½ T, then $A_2(T) = 2*A_2(t')$. Consequently, the dynamic range is effectively extended, while only a single amplitude needs to be kept for each pixel, along with a number that indicates the fraction of the total exposure time that had elapsed at the time the pixel amplitude was stored. Alternatively, only the compensated value need be kept, if pixel dynamic range processing is performed "on the fly" at the time of pixel acquisition.

If the light level were high enough, as at 103, the dynamic range can be extend further introducing more intermediate times, such as times t" and t'". In this example, at the level shown at 103 saturates between t" and t', the value $A_3(t")$ would be used and compensated accordingly. (Note that it is the last value before saturation (and an indication of which time it corresponds) that is kept, and then compensated, and not the first saturated value. Thus, for 103 the value used is $A_3(T") = (T/t")*A_3(t")$, not $A_3(T') = (T/t')*A_3(t')$.) The number of such intermediate times introduced is a design choice that needs to balance the amount of dynamic range increase desired against complexity and read out speed.

Figure 1:
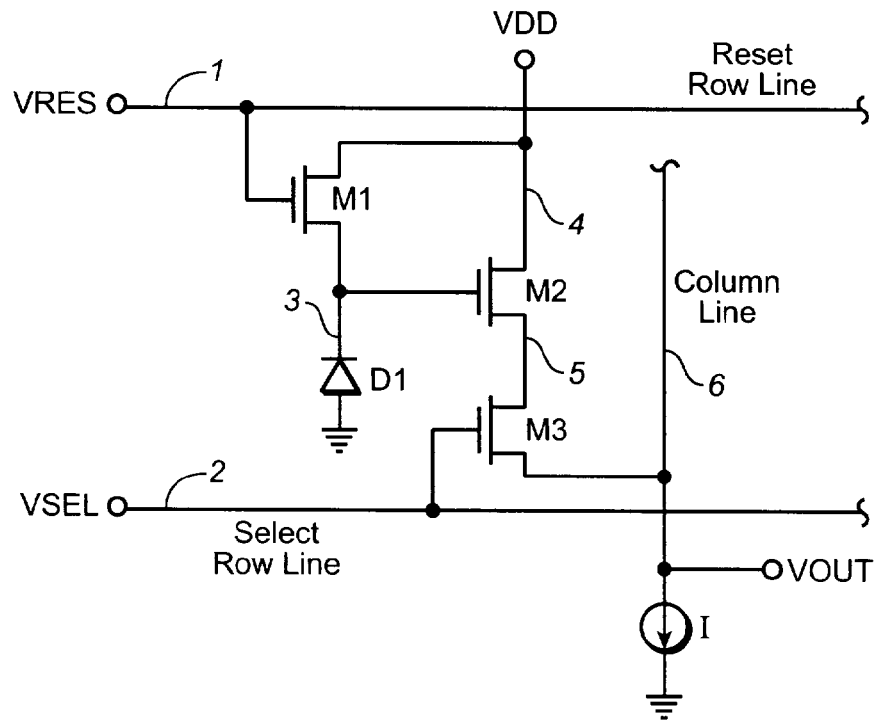
FIG. 1 shows an example of a three-transistor pixel circuit.

Although FIG. 3 shows the cumulative amount of incident light falling on a pixel during an exposure interval (which is monotonically nondecreasing), what is typically happening in a given sensor, such as CMOS photo sensors like that described with respect to FIG. 1, is that a quantity (such as the amount of charge on the diode) is decreasing in response to incident light until it hits the saturation level. Consequently, the parameter that is actually measured in the device of FIG. 1 is a voltage, V, of the form $V = V_{reset}*-f(A)$, where $V_{reset}$ is the reset value and f(A) is some increasing function of the total cumulative exposure.

Returning to FIGS. 1 and 2, the description of the various aspects of the present invention can be described in more detail using the arrangement given there for some exemplary embodiments. As describe in the Background, after a predetermined exposure time, the light intensity information for this pixel is read out by using the transistors M2 and M3, where transistor M2 serves as a source follower, the voltage on its source at 5 being a function of the diode voltage at 3, which is turn an indication of the amount of light to which it has been exposed. When this particular row of pixels is selected for readout, the row voltage VSEL on wire 2 is taken in a positive direction, turning on transistor M3, which is usually operated as a switch to connect the source terminal of M2 to the readout column line 6. A current sink I at the end of the column line provides operating current for the source follower M2, so that the output voltage on the column line VOUT will be proportional to the voltage on the diode at 3. It is important to note that the process of reading the intensity information from the pixel diode D1 does not inject any net charge to wire 3, so the readout process may be repeated without earlier readout actions affecting the later values. In other words the readout is "non-destructive".

After the intensity information is read out and is no longer needed, the row reset input VRES may be activated to cause the pixel voltages to be restored to the value representing zero light intensity. In addition to functioning as a reset transistor, M1 may also be used to limit the lower voltage to which wire 3 may descend. This prevents diode D1 from becoming zero or forward biased, and therefore prevents the injection of minority charges into the substrate. Charges injected into the substrate may diffuse to adjacent pixels, causing spreading or blooming in the image of bright image spots. In many systems, this anti-blooming feature is used to hold the pixel voltages at a lower level until the reset action is initiated to prepare for a new image exposure.

The device of FIG. 1 is one of the simpler three transistor cells in use, and various changes may be made to this design as known in the art to produce equivalent operation with additional advantages. For the purposes of the invention disclosed here, the exact structure of the pixel cell is not important, as long as the pixel may be read out in a non-destructive manner, at various times of our choosing, after the pixel charge is reset to a standard value. The readout information may take the form of either voltage or current, and may be read from a column line connected to either the source or the drain of the readout transistor circuit without affecting the operation of main aspects of the present invention.

As is clear from the discussion given with respect to FIG. 3, the relevant property of a sensor is that, within some range, it has some parameter that is either decreasing or increasing as it is exposed to light during an exposure period and that, either by choice or because it is inherent in the device, there is some limit to the range of this parameter. For the exemplary device in FIG. 1, the parameter is the amount of charge on line 3, which decreases from its initial reset value until either the exposure period ends or the saturation level is reached. If this parameter can be read non-destructively without resetting while exposure continues, the present invention can be used to extend the dynamic range of an imager made up of such devices. In the exemplary embodiments, the exposure period is broken up into ten subintervals of equal length, but, more generally, a different number of intermediate interrogations and subintervals of differing relative durations can be used.

In other embodiments, the exposure period can be broken up into a number of unequal intervals. Such an arrange can be used, for example, when the sensor does not respond linearly and its sensitivity (such as the incremental voltage output per incremental photon input) decreases as the sensor gets closer and closer to its saturation level. By increasing the time between interrogation cycles at the end of the exposure interval, this type of non-linearity can be compensated for.

Figure 2:
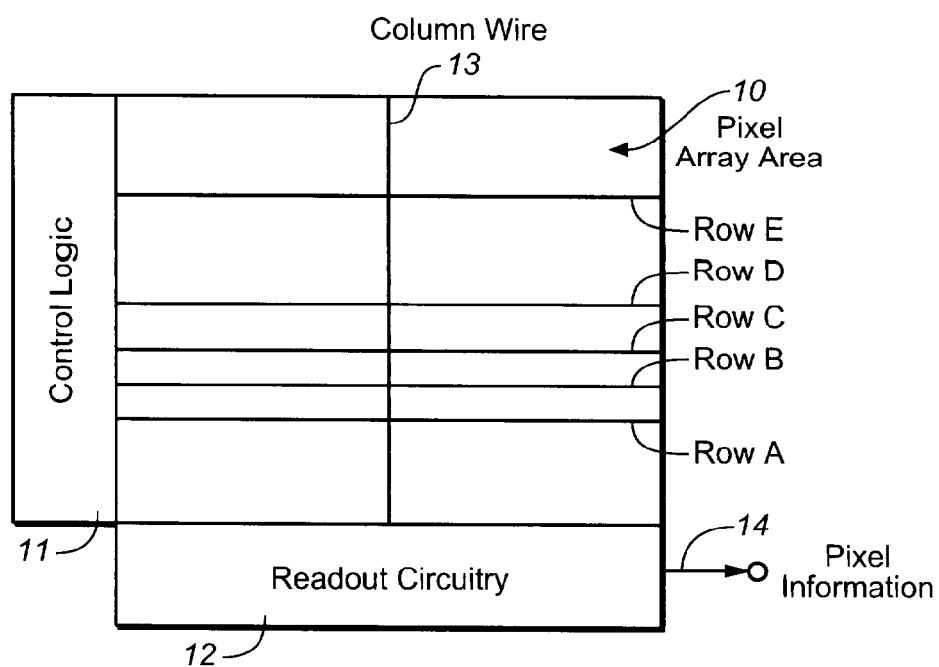
FIG. 2 illustrates a two-dimensional imager.

A first embodiment of the present invention employs the simple photo sensor of FIG. 1 and the pixel row and column arrangement of FIG. 2. Further, it employs the non-destructive interrogation of each row of the sensor pixels two or more times, for example, starting from the top of the sensor, and proceeding to the bottom of the sensor to significantly increase the effective dynamic range of the photo sensor. As discussed with respect to FIG. 2 in the Background section, the amount of image sensor pixel row exposure per interrogation cycle interval is a function of the row timing delay between the row reset action and the row readout action, as determined by the control logic. In most cases, this logic is driven by timing signals from the image capturing systems' (a digital camera for example) digital processor. Therefore, the amount of time each row has been exposed to light, at the instant the row is interrogated, is known a priori by the digital camera's processing engine. With this in mind, the method and apparatus employed by a simple exemplary implementation of the present invention could proceed through the following steps:

(1) Reset all rows of the image sensor starting from the top of the sensor and proceeding to the bottom of the sensor.

(2) Upon completion of resetting the last row of the image sensor, begin interrogating data from the first row of the sensor. Thus, exposure time for this first sensor pixel row will be equal to the time employed to reset the sensor array.

(3) Interrogate all rows of the image sensor, from the first pixel sensor row to the last pixel sensor row, over a time period equal to that employed to reset the entire image sensor array. This causes the first row to be reset to be the first row to be read, and the last row to be reset to be the last row to be read. Since the reset cycle time equals the interrogation cycle time in this example, each sensor pixel row will be exposed to light for the same amount of time before being read, assuming uniform row scanning. For example, if the reset and interrogation cycle times are 3 milliseconds, each pixel sensor row would be exposed for 3 milliseconds before row readout is initiated for that row.

(4) For this exemplary embodiment, a total of 10 interrogation cycles will be executed per photo sensor exposure interval. After reading the last pixel sensor row, the $1^{st}$ interrogation cycle will have been completed. Immediately thereafter, the $2^{nd}$ interrogation cycle is started, which is then followed by the $3^{rd}$, $4^{th}$, $5^{th}$, etc. interrogation cycles, until the $10^{th}$ interrogation cycle has been completed.

(5) Read each row of sensor pixel data from the $1^{st}$ interrogation cycle and store this pixel sensor row data in an image buffer memory. This data represents pixel sensor output produced at $1/10$ total exposure interval.

(6) Read each row of sensor pixel data from the $2^{nd}$ interrogation cycle. This data represents pixel sensor output produced at $2/10$ total exposure interval. Overwrite the sensor pixel data in the buffer memory from interrogation cycle 1 with sensor pixel data from interrogation cycle 2 if the sensor pixel data from interrogation cycle 2 is below a predefined threshold. This threshold flags sensor pixel data that is saturated or close to saturation. When a sensor pixel location in memory is not overwritten, because the sensor pixel data from interrogation cycle 2 is above the predefined threshold, store an indication in memory that this image pixel was acquired from the $1^{st}$ interrogation cycle.

Note that under this arrangement, no additional image buffer memory is needed, as only one value per pixel is kept, but there is a need to keep track of which interrogation cycle (1 to 10 in this example) the recorded value corresponds to. Note also that the exposure is continuous, without the sensors being reset, as all of the reads are nondestructive.

(7) Read each row of sensor pixel data from the $3^{rd}$ interrogation cycle. This data represents pixel sensor output produced at $3/10$ total exposure interval. Overwrite the sensor pixel data in buffer memory from interrogation cycle 2 with sensor pixel data from interrogation cycle 3, if the sensor pixel data from interrogation cycle 3 is below a predefined saturation threshold. When a sensor pixel location in memory is not overwritten, because the sensor pixel data from interrogation cycle 3 is above the predefined saturation threshold, store an indication in memory that this image pixel was acquired from the $2^{nd}$ interrogation cycle.

(8) Continue the image sensor interrogation process outlined in (6) until all 10 interrogation cycles have been executed. After the $10^{th}$ interrogation cycle, the image buffer memory contains a complete image composed of sensor pixel data captured at exposure times ranging from 1/10 total pixel exposure interval to 10/10 total pixel exposure interval. Along with the stored data for each image pixel is an indication of the interrogation cycle number from which it was acquired. Note that none of the pixel data stored in the image buffer memory are positively saturated, that is, saturated due to excessive exposure to light.

(9) By use of the digital camera's processor, multiply the value of each sensor pixel by the total number of interrogation cycles divided by the interrogation cycle number from which it was acquired. This process places the effective value of each pixel at the point in the dynamic range of the output digital image that corresponds to the intensity of the pixel in the captured physical scene.

(10) An alternative to storing the value of each sensor pixel in the image buffer memory, along with interrogation cycle number from which it was acquired, is to overwrite the value of a stored pixel by its stored value multiplied by the total number of interrogation cycles divided by the current interrogation cycle number −1, when it found that the pixel value for that location, as read during the current interrogation cycle, is above the predefined saturation threshold. This places the effective value of each pixel in the image buffer at the point in the dynamic range of the output digital image that corresponds to the intensity of the pixel in the captured physical scene without the need for:
 a) additional memory to hold interrogation cycle number information for each pixel in the image;
 b) a subsequent operation on the stored image buffer data by the digital camera's processor.

As described, it is possible that one or more pixels of a sensor may saturate before the first interrogation is performed; however, when this occurs the camera (or other imaging system) can reduce the sensitivity of the image sensor using the overall exposure control mechanisms of the camera. This can be done by reducing the size of the digital camera's aperture until all pixels of the sensor no longer saturate. Since the range of light reduction due to aperture closure can be very wide, from full light falling on the sensor to complete light blockage, the circumstance of portions of the image sensor being saturated before the first read can be prevented. Note that under the arrangement of the present invention, the maximum aperture setting can be based on the exposure level at the end of the first exposure subinterval, rather than the full interval, allowing darker regions the benefit of longer exposures and the consequent better definition. In some cases, however, there is often a desire on the part of the camera user to emphasis certain portions of the image at the expense of other portions of the image, therefore this camera behavior can be overridden by the user, if desired, to obtain a particular image effect. This desire is mainly associated with the limited dynamic range of prior art approaches. Note that the present invention significantly reduces the need for such user intervention because of the increased image dynamic range provided.

The above scenario called for 10 non-destructive reads of the image sensor during a single pixel exposure interval. This results in a 10 times increase in the dynamic range of the captured image. A greater or lesser number of non-destructive reads of the image sensor during a single exposure interval would increase or decrease the dynamic range of the captured image proportionally. Note that negative pixel saturation, that is the loss of image details due to insufficient sensor exposure to light, is prevented by lengthening the overall exposure time and non-destructively reading the image sensor a greater number of times. Since the pixels from the bright parts of the image use a shorter effective exposure time, when this approach is used the bright areas of the image will be sharper and display less motion artifacts than the dim areas of the image.

Figure 4:
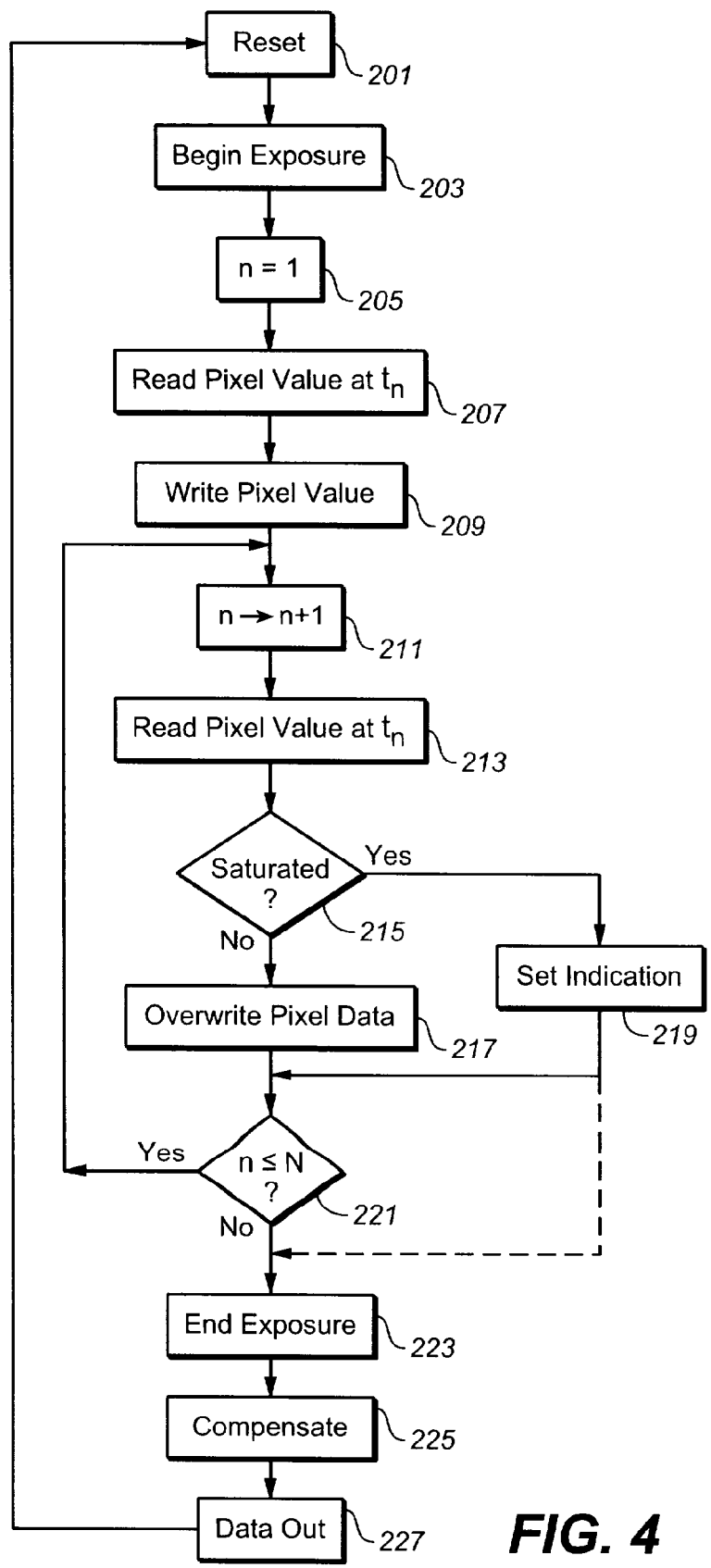
FIG. 4 is a flow chart of an exemplary embodiment as seen by a pixel.

FIG. 4 is a simplified flowchart of the above process as seen by a given pixel, or row of pixels, beginning with the sensor being reset at 201 and the exposure beginning at 203, where the index n introduced and initialized to n=1 for the purposes of this flow at step 205 in order to keep track of the exposure sub-intervals. As discussed above, in one aspect of the present invention, the sensor is exposed continually, without reset, for the entirety of the exposure period. The parameter indicative of the amount of cumulative light to which the pixel is exposed will be called the amplitude A for this discussion and, for simplicity, taken to increase with exposure. In the actual sensor, the parameter measured may actually decrease, as in the CMOS sensor of FIG. 1 where a voltage V starts at a reset value, $V_{reset}$, and discharges based on light intensity.

The first interrogation, at time $t_1$, is made at 207 and the amplitude $A(t_1)$ of the pixel is recorded at 209, with the index n being incremented at 211 as the process enters the loop for the remaining subintervals.

At the end of the next subinterval, $t_n$, the cumulative amplitude $A(t_n)$ is read at 213 and step 215 determines whether the limit values, such as the saturation level S, has been reached. If $A(t_n)<S$, the pixel value is overwritten at 217. (It should again be noted that what is actually being measured is some parameter indicative of this exposure amplitude and that this parameter may actually decrease with exposure: for example, in the exemplary embodiment it is the voltage at the diode which is measured and this parameter starts at the reset value and decreases until either the exposure ends or it reaches the saturation level. Consequently, the correct statement of step 215 in this case would be $V>V_{saturation}$.)

Should the limit be exceeded, an indication is then set at 219 to note that the recorded amplitude corresponds to previous loop (n−1 at this point) and that this will be the value used to construct the final value. It should be clear that a number of implementations can be used for this step. For example, as the amplitude for each value of n is recorded, the corresponding value of n is also recorded and once the limit is reached, neither n nor $A(t_n)$ are updated further, so that at step 219 the indicator (n value) has already been set in the preceding loop and is just not updated. At this point the pixel can either remain in the loop, with the yes path out of 215 being taken in each further iteration, or it can just be taken out of the loop and wait for the full exposure period to end.

The flow then continues on to step 221 to determine whether the end of the full exposure interval has elapsed and the final interrogation has been made: if not (n≦N), the flow loops back to 211; if so (N>n), the exposure is ended (223). At this point, the amplitude written for each pixel will be $A(t_N)$ (or $[A(t_N),N]$) if the limit was not reached and $[A(t_n), n]$ if it did reach its limit, where n is the index of the last sub-interval before the limit was reached. Step 225 then compensates the amplitudes for the written pixel amplitude values, using the equation $A(t_N)=A(t_n)*(n/N)$, so that a pixel amplitude equivalent to the amplitude that would have been obtain over the full exposure interval, should saturation not have occurred, is available at step 227. For the case where the limit value for the amplitude was never reached, the compensation is trivially just the amplitude (or, more accurately, parameter value) at $T=t_N$, since $n/N=1$. Once the exposure is finished at 223, the process is then ready to return to the beginning and the pixel can be reset for the next photo or frame of video.

As noted, FIG. 4 represents the process flow for just a single pixel location or row of pixels, where the read of the whole array is given in more detail above. In the above embodiment, the time between each read (time given over for the loop) is based on the time to reset or read all the rows in the array and return to the pixel. (In the embodiment below, it is based on the time to reset or read the groups into which the rows are divided.) Note that in the above arrangement, all pixels have equal exposure intervals or sub-intervals—or, more accurately, essentially equal exposure intervals or sub-intervals due to the variations inherent in the design and operation of such devices.

The embodiment of the present invention described in the preceding paragraphs operates the CMOS sensor at a speed which increases in proportion to the number of interrogation cycles used. For the embodiment implementation example disclosed, this means that the sensor would be readout 10 times faster to achieve the same effective exposure time. In absolute terms, assuming a photo sensor with 9 million pixels arranged in a grid of 3000 rows by 3000 pixels per row, the stated reset and interrogation cycle times of 3 milliseconds, and the stated use of 10 interrogation cycles, an implementation employing an exposure interval of 30 milliseconds would require the interrogation or reset of 3000 rows of image sensor pixels in 3 milliseconds, and therefore the data from each pixel sensor in each row to be sequentially clocked out of the sensor at a data rate of 1 MHz. This is relatively fast by current standards, which would employ 1 interrogation cycle for a 30 millisecond exposure interval, require the interrogation or reset of 3000 rows of image sensor pixels in 30 milliseconds, and therefore the data from each pixel sensor in each row to be sequentially clocked out of the sensor at a data rate of 100 KHz.

There are a number of ways of mitigating the need for increased sensor speed. First, fewer than 10 interrogation cycle times can be used. This will reduce the dynamic range increase from a factor of 10 down to a factor equal to the number of interrogation cycle times used. However, even a 2 times increase in dynamic range is a significant advance over the dynamic range offered by the typical digital camera, and consumers would welcome such an improvement.

Second, consider now an image sensor that has the incorporated capability for reset or readout of several groups of rows at a time, each at different locations on the image sensor. In this case, image information may be effectively and simultaneously obtained from bands of sensor rows for multiple interrogations cycles. In this embodiment, Group A, the rows of lines between "A" and "B" of FIG. 2, are reset and read out in accordance with the series of steps defined under the embodiment described earlier. If, for this example, a sensor is used that has 3000 rows of pixels, the A, B, C, D, and E lines groups would each contain 600 rows, assuming an equal number of lines in each row group. Note that equal row groupings are not depicted in FIG. 2. Readout circuitry 12 of FIG. 2 is responsible for converting these rows of pixel information and sending out image pixel data on the connection 14 as parallel data. This effectively cuts the data rate on each output line by a factor of 5. For this example that means that the output data rate from the image sensor is 200 KHz, a number only a factor of two away from the 100 KHz rate encountered when only one interrogation cycle is employed, as is the case for prior art sensors and digital camera systems.

The 5 lines of parallel picture data emanating from the image sensor would each be converted into digital form using separate A to D converters. The digital camera processor would accept these 5 digital data streams and using the approach previously outlined, process this pixel information back into a single image with extended dynamic range for each pixel.

As noted above, since the number of photons incident on bright areas will accumulate more rapidly, the pixels from the bright parts of the image use an effective shorter exposure time than the darker parts of the image. In addition to expanding the dynamic range of the sensor array, this use of multiple, variable exposure times within a single frame allows the bright areas of the image to be sharper, displaying less motion artifacts than the dim areas of the image. As the brighter portions of the image are often the more important parts, the resultant crisper image in bright areas, while allowing darker areas longer effective exposure time, is another benefit provided by the present invention.

In alternate embodiments of the present invention, the use of the variable exposure times within a single image can be user determined, rather than automatically based on the amount of light incident on a given pixel. For example, a user could select a portion of the frame for a shorter exposure time in order to reduce motion artifacts or produce other effects within the camera. According to the embodiment, this portion of the image could be selected beforehand or afterwards. If performed afterwards, this can be implemented by overwriting the pixels of the selected region with earlier recorded values.

Figure 5:
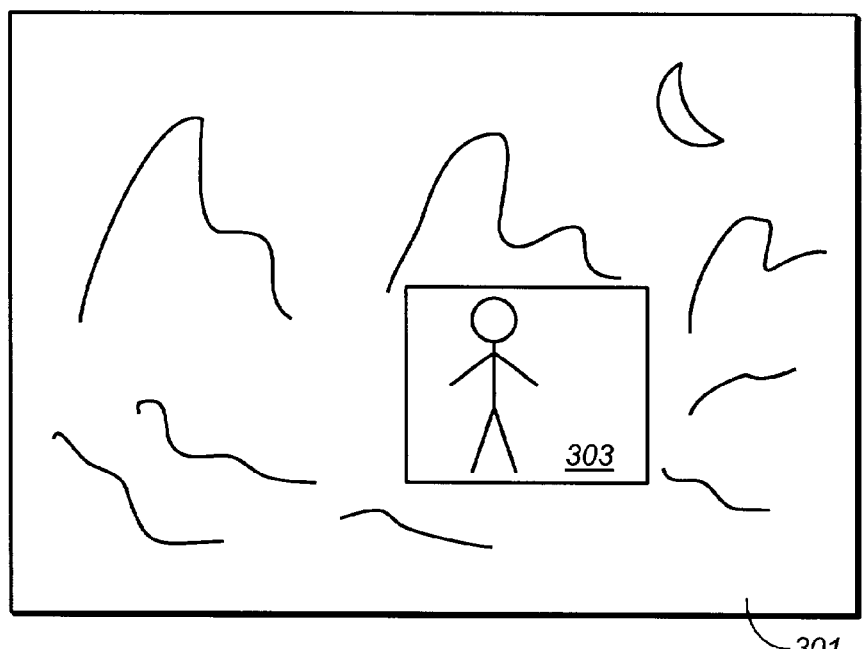
FIG. 5 shows a portion of an image selected for manipulation.

Although in the main embodiments of the present invention a primary aspect is the ability to expand dynamic while only storing a single value for each sensor, the ability to concurrently store one or more additional values may also be incorporated. This would allow the sort of overwriting by an early value discussed in the last paragraph. These extra values could then be used for this sort of image sharpening as well as for other selected effects, allowing for a sort of "digital darkroom" set of manipulations to be performed on the camera or imaging system. For example, in FIG. 5 the whole of the image is indicated at 301 as displayed on, say, the viewer of the camera. Within this image, a portion 303 can then be selected for this sort of post-processing through the user interface. In addition to the sort of manipulations already described, the selected portion could also have extra compensation to brighten or increase contrast in low light regions or to "fix" a pixel that is near saturation, or just over saturation, whose "saturated" value was recorded, and a previous value would look better in the final image.

Figure 6:
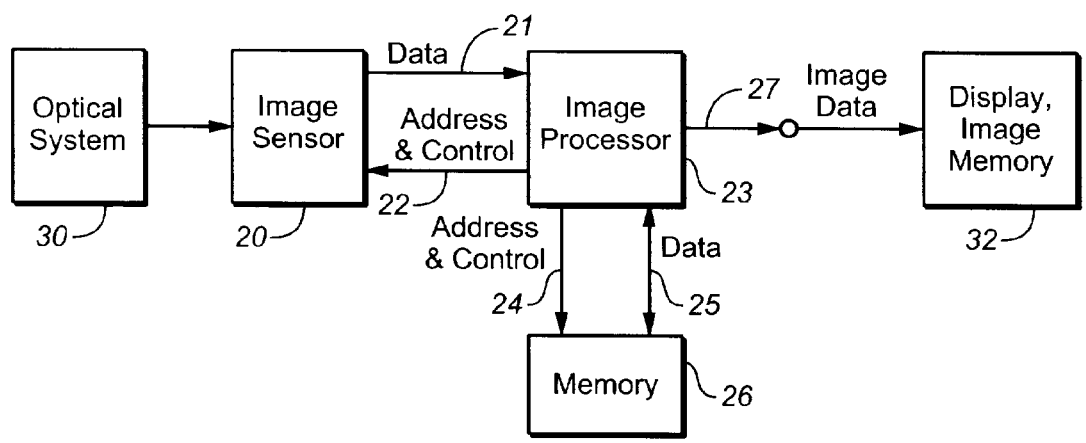
FIG. 6 is a block diagram of a wide dynamic range image capturing system.

FIG. 6 is a block diagram showing an example of wide dynamic range image capture system utilizing the above image sensor design as part of a camera. Although the image capture system is often described here as a still or video camera, more generally it can be a handheld device, such as a phone or PDA, or other digital appliance that includes an image capture system. An image sensor 20 with multiple row readout capabilities is used together with an image processor 23 and memory 26. As the image is scanned, the processor receives the various pixel row data values and either stores them in appropriate locations in the memory 26 in a manner convenient for the later mathematical manipulations, or performs the dynamic range extension processing as outlined in Step (10) above, "on the fly", in other words, as the image data is received. Image scan control is done with the control signals 22, and data to the processor is on wire 21, which for this example represents multiple buses of sensor data after A to D conversion, in order, as previously explained, to reduce data rate requirements. If sensor speeds and processor capabilities allow, line 21 can be a single line, and the above FIG. 6 would represent an exemplary apparatus for both the first and second embodiments given above. For some architectures, the image data may connect directly to the memory 26. Data in the memory is located using the address and control lines 24, and transferred between the processor and the memory on lines 25. If Steps (1) through (9) above are followed, the processor scans the stored data and produces image data output incorporating the best image data for each pixel location. In this way the dynamic range of the image is extended by the ratio of the longest effective exposure time to the shortest effective exposure time read out.

The image processor outputs its final image data on the wires 27 to the remainder of the imaging system. This data may be the pixel data as generated by the mathematical algorithms driving processor 23, or other information derived from the image data.

In addition to these elements, the camera or other device will include the various other elements as are familiar in the art. These would typically include an optical system 30, containing the lenses and aperture that supply the illumination to expose the image sensor, and a display unit or storage 32, such as a memory card, to store the images. The various other elements and control circuitry (exposure control and so on) are not explicitly shown in the figure.

As noted in the Background section, there are various prior art methods and apparatus that have been proposed to increase the dynamic range of photo sensors in general, and CMOS sensors in particular. However, many of these devices suffer from the need to either use non-standard CMOS sensors that are significantly more costly to manufacture and control than the CMOS sensors commonly in use, or require significantly more image buffer memory to properly operate. One proposed approach for increasing CMOS sensor dynamic range, while using standard CMOS sensors, is to capture two to more images, taken very close together in time, at different exposures, at least one which displays the shadow detail of the image (taken at a high exposure) and at least one which displays the highlight detail (taken at a low exposure). These multiple images, which need to be corrected for any motion present in the images occurring between individual image capture, are combined into a single image that displays both shadow and highlight detail. This can provide some enhancement of dynamic range; however, the processing complexity to motion compensate and appropriately combine the two or more captured images, and the additional buffer memory required, is excessive by today's standards, and therefore this solution, to date, has not been shown as a practical answer to the problem. As the present invention does not require extra buffer space to achieve CMOS sensor dynamic range extension, and minimal additional processing is required, it is believed to be a better way to solve the problem. By using only a single exposure, without resetting during the exposure interval, and storing and reading out only a single value per pixel, the present invention resolves the imaging system manufacturing cost and control issues, and provides a practical solution that in the past has not been available.

The present examples are to be considered as illustrative and not restrictive, and the invention is not to be limited to the details given herein, but may be modified within the scope of the appended claims.

It is claimed:

1. A method of operating an image sensor array having one or more photo sensitive pixels that can be non-destructively interrogated for a parameter value indicative of the cumulative amount of light to which individual ones of said pixels have been exposed, the sensor being continuously exposed to said light during a known time interval, the method comprising:
    interrogating a first pixel for a parameter value at a first time value during the interval;
    recording the value of the parameter at the first time value;
    at a second time value during the time interval, interrogating the first pixel to obtain a second parameter value;
    determining whether the parameter value at the second time value exceeds a limit value;
    substituting the second parameter value for the first parameter value if the limit value is not exceeded, otherwise maintaining the first parameter value; and
    determining the value of the parameter corresponding to the cumulative amount of exposure to light for the entire time interval based on the recorded value of the parameter and the time value to which the recorded value of the parameter corresponds.

2. The method of claim 1, further comprising:
    maintaining an indication of the time value to which the recorded value of the parameter corresponds.

3. The method of claim 2, wherein said determining the value of the parameter uses the maintained value of the time value to which the recorded value of the parameter corresponds.

4. The method of claim 1, wherein said determining the value of the parameter is performed prior to the time interval concluding.

5. The method of claim 1, wherein said determining the value of the parameter is performed subsequent to the time interval concluding.

6. The method of claim 1, wherein said second time value corresponds to an intermediate time prior to the end of the time interval.

7. The method of claim 1, wherein said second time value corresponds to the end of the time interval.

8. The method of claim 1, wherein said time values subdivide the time interval into a plurality of essentially equal subintervals.

9. The method of claim 1, wherein said time values subdivide the time interval into a plurality of unequal subintervals.

10. The method of claim 1, wherein said determining the value of the parameter includes:
    compensating the value of the parameter based on the duration of the portion of the interval to which the value of the parameter corresponds relative to duration the entire interval.

11. The method of claim 1, wherein said limit value is a saturation value of the sensor.

12. The method of claim 1, wherein said limit value is less than a saturation value of the sensor.

13. The method of claim 1, wherein said parameter value is a voltage level.

14. The method of claim 1, wherein said pixels are CMOS sensors.

15. The method of claim 1, wherein said image sensor array is part of a still camera.

16. The method of claim 1, wherein said image sensor array is part of a video camera.

17. The method of claim 1, wherein said image sensor array is part of a hand held appliance.

18. A method of operating an image capture system including an image sensor having one or more photo sensitive pixels that can be individually non-destructively interrogated for a parameter value indicative of the cumulative amount of light to which the individual pixel has been exposed, the method comprising:

resetting a first of said pixels;

subsequent to resetting the first pixel, continuously exposing the first pixel for a time interval without being reset;

interrogating the first pixel for the parameter value at the first time value during the interval;

recording the value of the parameter at the first time value;

at a time value during the interval subsequent to the first time value, interrogating the first pixel for the parameter value;

determining whether the parameter value at the subsequent time value exceeds a limit value;

overwriting the recorded parameter value with the value of the parameter at the subsequent time value if the limit value is not exceeded, otherwise maintaining the recorded value;

maintaining an indication of the time value to which recorded value of the parameter corresponds; and determining the value of the parameter corresponding to the cumulative amount of exposure to light for the entire time interval based on the recorded value of the parameter and the indication.

19. The method of claim 18, wherein said subsequent time value corresponds to an intermediate time prior to the end of the time interval.

20. The method of claim 18, wherein said subsequent time value corresponds to the end of the time interval.

21. The method of claim 20, further comprising:

at each of one or more intermediate time value during the interval subsequent to the first time value and prior to the end of the time interval, interrogating the first pixel for the parameter value;

determining for each of intermediate time values whether the parameter value exceeds said limit value; and overwriting the recorded parameter value with the value of the parameter at each of the intermediate time values if the limit value is not exceeded, otherwise maintaining the recorded value.

22. The method of claim 18, wherein said time values subdivide the time interval into a plurality of essentially equal subintervals.

23. he method of claim 18, wherein said time values subdivide the time interval into a plurality of unequal subintervals.

24. The method of claim 18, wherein said determining the value of the parameter corresponding to the cumulative amount of light for the entire time interval includes:

compensating the recorded value of the parameter based on the duration of the portion of the interval to which the value of the parameter corresponds relative to duration the entire interval.

25. The method of claim 18, wherein said limit value is a saturation value of the sensor.

26. The method of claim 18, wherein said limit value is less than a saturation value of the sensor.

27. The method of claim 18, wherein said parameter value is a voltage level.

28. The method of claim 27, wherein said resetting sets the voltage level to an initial value which then discharges based on the cumulative amount of light to which the individual pixel has been exposed.

29. The method of claim 18, wherein said pixels are CMOS sensors.

30. The method of claim 18, wherein said image capture system is still camera.

31. The method of claim 18, wherein said image capture system is a video camera.

32. The method of claim 18, wherein said image capture system is a hand held appliance.

* * * * *

UNITED STATES PATENT AND TRADEMARK OFFICE
CERTIFICATE OF CORRECTION

| | | |
|---|---|---|
| PATENT NO. | : 7,714,903 B2 | Page 1 of 1 |
| APPLICATION NO. | : 11/467993 | |
| DATED | : May 11, 2010 | |
| INVENTOR(S) | : Shimon Pertsel and Ohad Meitav | |

It is certified that error appears in the above-identified patent and that said Letters Patent is hereby corrected as shown below:

Col. 14, in claim 10, line 46, replace "duration the" with "a duration of the"

Col. 15, in claim 18, line 19, replace "recorded" with "the recorded".

Col. 15, in claim 21, line 31, replace "value" with "values".

Col. 16, in claim 23, line 8, replace "method" with "The method".

Col. 16, in claim 24, line 16, replace "duration" with "a duration of".

Col. 16, in claim 30, line 31, replace "still" with "a still".

Signed and Sealed this
Eighth Day of March, 2011

David J. Kappos
*Director of the United States Patent and Trademark Office*